United States Patent [19]
Schneider

[11] Patent Number: 4,606,573
[45] Date of Patent: Aug. 19, 1986

[54] CONVERTIBLE ROOF CONVERSION KIT

[76] Inventor: Bernd Schneider, Löhdorferstrasse 178, 5650 Solingen 12, Fed. Rep. of Germany

[21] Appl. No.: 672,806

[22] Filed: Nov. 19, 1984

[30] Foreign Application Priority Data

Nov. 18, 1983 [DE] Fed. Rep. of Germany ....... 8333168

[51] Int. Cl.⁴ .............................................. B62D 25/06
[52] U.S. Cl. .................................... 296/210; 296/136
[58] Field of Search .............. 296/210, 136; D12/156; 29/401.1

[56] References Cited

U.S. PATENT DOCUMENTS

| | | | |
|---|---|---|---|
| 2,765,192 | 10/1956 | Blake | 296/210 |
| 2,787,311 | 4/1957 | Cohen | 296/210 |
| 3,935,353 | 1/1976 | Doerfling | 296/210 |
| 4,218,088 | 8/1980 | Swindlehurst | 296/210 |

Primary Examiner—Robert R. Song
Attorney, Agent, or Firm—Steele, Gould & Fried

[57] ABSTRACT

A simulated convertible roof conversion kit for an automobile with a rigid roof and a rear window, comprising: a skeleton-like frame forming a tub-shaped supporting structure having at least one protruding stay perpendicular to the longitudinal direction of the roof when the structure is mounted; a covering for the supporting structure, connected to the supporting structure and having an opening in a rear section thereof alignable with the rear window; and, fasteners disposed on edge sections of the supporting structure for engaging roof trim structure of the automobile, whereby the conversion may be effected without permanently altering the automobile.

11 Claims, 6 Drawing Figures

CONVERTIBLE ROOF CONVERSION KIT

BACKGROUND OF THE INVENTION

1. Field of the Invention

This invention relates to a convertible roof conversion kit for a passenger car with a rigid, nonconvertible roof.

2. Description of the Prior Art

Passenger cars are often designed with open construction and a roof which can be folded back. Such cars can be driven open or closed. In the closed position, the convertible roof forms the roof of a passenger car, the cover being in form of canvas-material which forms a seal and which is carried by a collapsible frame.

Existing conversions of cars to simulated convertible roofs require permanent alteration or perforation of the automobile, for example, rivets attached to the roof. This invention provides a conversion method resulting in no permanent damage or alteration to the automobile.

SUMMARY OF THE INVENTION

A convertible roof conversion kit according to this invention fits over the outside of a regular passenger car with a rigid roof, with a closed construction. The conversion roof appears to be convertible roof. A simulated convertible roof conversion kit according to this invention comprises: a skeleton-like frame forming a tub-shaped supporting structure having at least one protruding stay perpendicular to the longitudinal direction of the roof when the structure is mounted; a covering for the supporting structure, connected to the supporting structure and having an opening in a rear section thereof alignable with the rear windows; and, fastening means disposed on edge sections of the supporting structure for engaging roof trim structure of the automobile, whereby the conversion may be effected without permanently altering the automobile.

A passenger car equipped with such a convertible roof can thereby barely be distinguished from a real convertible with the roof closed. The difference is however in its function, for the simulated convertible roof cannot be folded back. Therefore the car cannot be driven with the roof open.

The convertible roof conversion has essentially the same dimensions as would a real convertible roof. It starts above the windshield and the side windows and includes the rear window, for which the above mentioned opening is provided. The shape of the tub-shaped supporting structure is adapted to the type of passenger car to be equipped. As a bowl it is more or less a cast of the outer surface of the roof and rear window area of a passenger car. Expressed differently, a convertible roof conversion has to be constructed for each type of passenger car, which is adapted to its shape and size. The tub-shaped supporting structure is constructed as flat as possible. Its essential functions are to fasten the covering and to support the covering such that as is true with a real convertible roof. It appears to be supported only on certain lines, while the section between the supporting lines, as is also true for a real convertible roof formed by a frame, seem to sag slightly, whereby the material hangs slackly like a rope supported on two endpoints. This typically softly sagging of the covering between the supporting lines is obtained by the stays of the supporting structure. These are in the same locations where, in a true convertible roof, the crossbars of the roof should normally be located.

The covering itself is almost the same as the covering of a true convertible. It has practically the same shape, the same cut and the same dimensions. Suitable materials for the covering include canvas, foil, plastic material, leatherette and similar materials.

The supporting structure is fastened around its edges to the structure of the passenger car by the fastening elements. The support is on the sides, preferably on the rain gutter, and in the front and in back, preferably under the trim or in openings provided for the trim. Basically, however, fastening can take place on all other edges of the vehicle near the section where the roof ends. Finally, the fastening elements can also be formed through adhesive surface sections.

The convertible roof conversion kit is intended mainly for sedans and lends the look of a convertible. This constitutes the essential advantage of the simulated convertible roof. This is a distinct, optical difference between the standard shape of a sedan and a sporty convertible. Contrary to a true convertible, the rigid roof is retained, so that leakage problems appearing with true convertibles do not occur. Moreover the rigid roof of the sedan supports the automobile construction, which is of special advantage in accidents where the car rolls over. Finally, the convertible roof conversion adds to the thermal insulation. Break-ins reported frequently through the roof canvas cannot take place with the simulated convertible roof.

Basically, the covering material can be connected with a supporting structure in the shape of a bowl. However, to achieve a better convertible effect, the covering is peferably connected to the supporting structure only on certain lines. To achieve better support, the section under the covering material and between the stays is upholstered with foam rubber or similar soft, flexible material. The foam rubber parts are thereby shaped essentially as the somewhat sagging covering of a true convertible described above.

Good support of the covering material is thereby achieved, which, especially at high speeds, prevents lifting of the covering material.

Furthermore, preferably only soft, flexible intermediate layers, especially foam rubber cushions, are arranged on the bottom side of the supporting structure, so that the supporting structure does not touch the roof of the passenger car. This eliminates damage to the paint of the roof of the automobile, so that there is no permanent damage if, at a later date, the convertible roof conversion is removed. The construction of the convertible roof conversion of this invention makes it possible to attach it at a later date to the sedan without having to make permanent changes on the automobile itself. This invention uses the fastening possibilities already present on the car.

It has been assumed for purpose of description that the convertible roof conversion is attached at a later date to a passenger car with rigid roof. However, this does not exclude the possibility that such a simulated convertible roof may be mounted during the manufacture of the automobile in the assembly plant, for example as optional factory equipment.

The shape and lay out of the fastening elements is determined mainly by the possibilities present at the passenger car to be equipped. Attachment by the fastening elements must ensure that no wind or dampness is able to penetrate between the simulated convertible roof and the roof of the sedan. In an advantageous design of this invention it is therefore suggested to equip the simulated convertible roof with a flap, especially on the side, which may be sewn on. The flap covers the fastening elements towards the outside and at the same time provides a seal. The edge of the flap thereby forms a piping, just as the case with a true convertible. In a preferred design the fastening elements are equipped with turnbuckles, which enable tightening of the convertible roof convertion on the automobile roof. Secure fastening can thus be achieved, even suitable for high speeds. Furthermore, the tolerances in the roof of the sedan and the simulated convertible roof are balanced.

It proved to be very advantageous not to leave air spaces between the roof surface of the sedan and the covering which forms the outer layer of the simulated convertible roof, by filling all possible hollow spaces with foam rubber. It is also very advantageous to leave certain hollow spaces, as this improved the convertible look. The air spaces have to be connected with the outer air such that condensation, etc. is removed, yet at the same time, that no unusual noises, etc. appear.

It is basic object of this invention to equip a sedan and change its appearance, so that it appears to be a convertible with closed roof.

The most favorable fastening of the simulated convertible roof to the roof of the sedan, without permanent contact to the car, should be achieved, so that no damage is done to the sedan through attaching and driving with the simulated convertible roof.

This object is achieved by the convertible roof conversion kit described in the specification and recited in the claims.

Other advantages and characteristics of this invention will be apparent from the following description and the drawings.

DETAILED DESCRIPTION OF THE PREFERRED EMBODIMENTS

Figure 1:
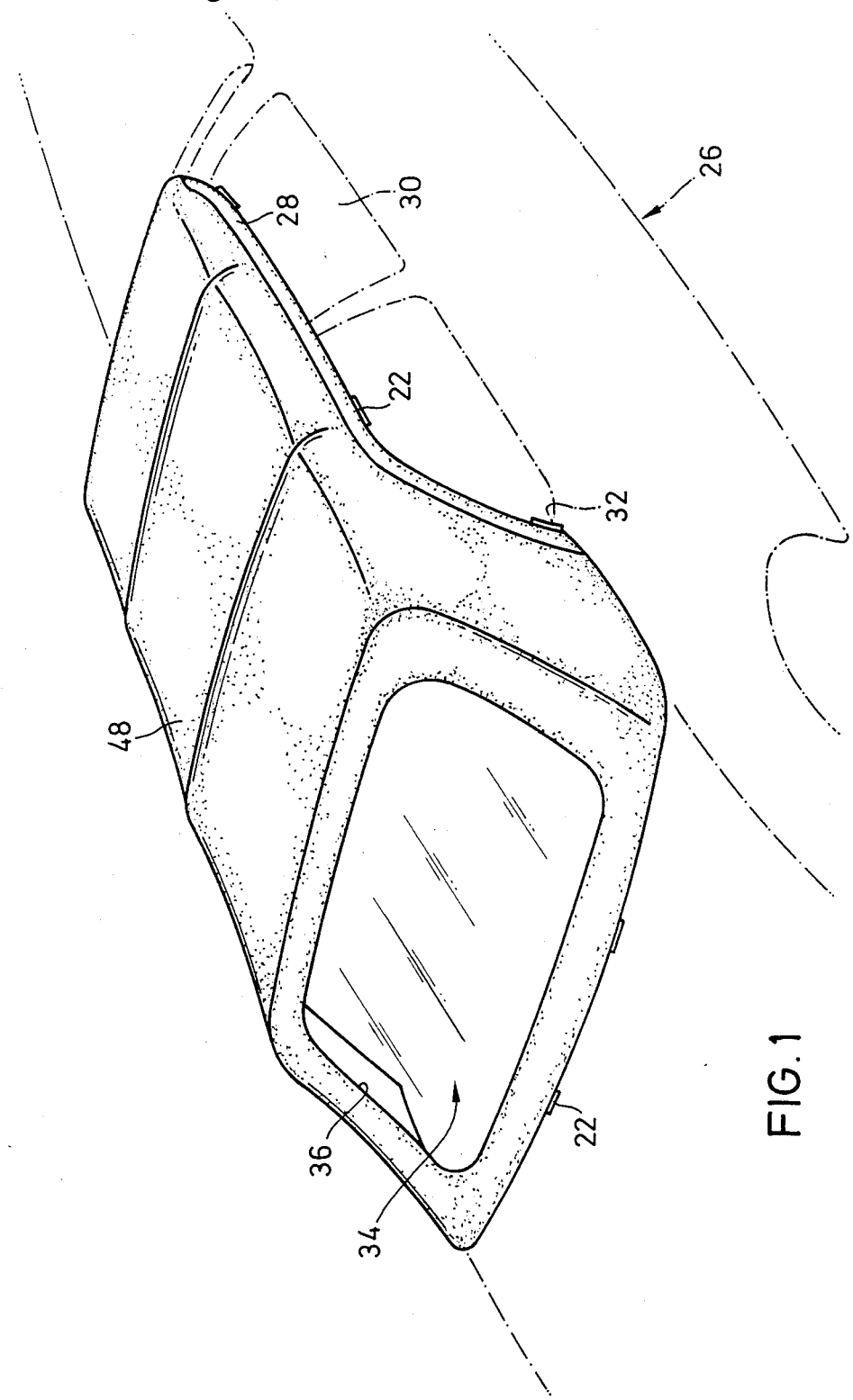
FIG. 1 is a perspective drawing of a center section of a sedan, to which roof a convertible roof conversion is mounted.

The simulated convertible roof in FIG. 1 is mounted on a sedan, however, the convertible roof conversion is basically suited for all other passenger cars with closed construction, such as station wagons, all terrain vehicles, or the like. Typically, the conversion roof is so shaped that the simulated convertible roof always starts near the upper edge of the windshield and the side windows, that it follows the outline of the side window down to the lower edge of the side window opening and encompasses the rear window in this height.

The supporting element of the simulated convertible roof is a tub-shaped supporting structure, which for example, can be constructed by a skeleton-type layout 18 of rods. In the example shown, the supporting structure is always a bowl 20 made of plastic material. The supporting structure itself is not rigid, but elastic and flexible to a certain extent, so that it can adapt exactly to the shape of the roof section of a sedan. It is, however, possible that the supporting structure be of rigid construction. A relatively flexible construction is also possible, as the stability of the shape of the mounted simulated roof is guaranteed by the roof of the sedan.

All around the outer edge of the bowl 20, fastening elements 22, 24 are provided, which make fastening to projections on the roof sections of a sedan 26 possible. A strong connection, for example with adhesive, may also be possible.

The convertible roof conversion has a sewn-on flap on the side sections. This flap extends from the upper forward edge of the forward side window 30 to the rear edge 32 of the rear side window. This flap is several centimeters wide and partially corresponds to the flap 28 found on true convertibles. The flap not only helps to seal the simulated convertible roof, but optically covers the fastening elements 22, 24 as well.

In the rear window section 34, the convertible roof conversion has an opening 36, which follows the outline of the rear window 34. In this section the simulated convertible roof is connected to the sedan to avoid penetration of humidity and wind. The connection takes place, for example, at or along the rubber molding section of the rear window. It is also possible to construct the opening 36 in a rigid manner, but it is harder to produce a seal. A complete seal is, however, not generally required, because a sedan in itself is tight. What must be prevented are pockets or cavities between the convertible roof conversion and the roof of the sedan which might fill with water.

Figure 2:
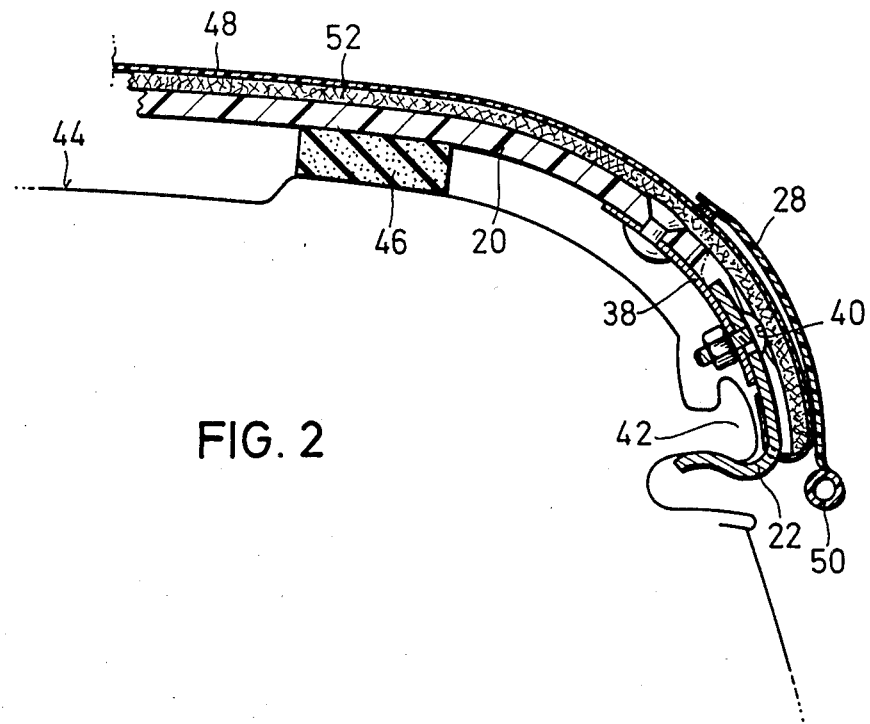
FIG. 2 is a sectional view of the outer section of a convertible roof conversion with hooks as fastening elements.
Figure 3:
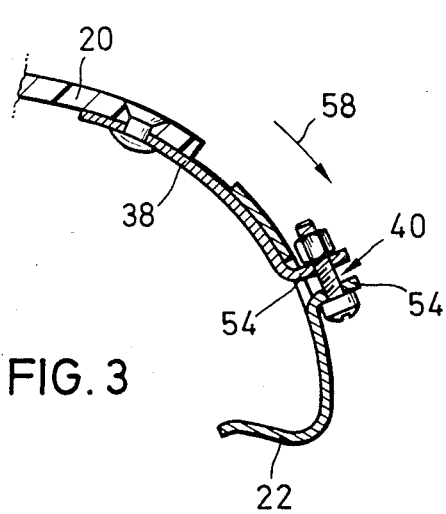
FIG. 3 is a detail of FIG. 2 with the bowl-shaped supporting structure, a hook and vertical fittings.
Figure 4:
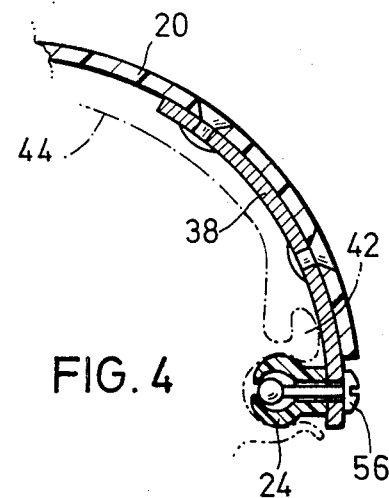
FIG. 4 is an illustration in accordance with FIG. 3, however, with a spreader instead of a hook as fastening element.

The convertible roof conversion shown in the examples has a rigid bowl 20 of plastic material. Fastening on individual fastening locations with a distance of 50 centimeters, for example, is therefore sufficient. The fastening elements used for the fastening locations are shown in FIGS. 2 to 4. Other elements, which are for example used with other roof mountings, can also be used.

In the example in FIG. 2, a strap 38 is riveted to the bowl 20, which is connected with an L-shaped hook 22 over a screw connection. One of the parts 38, 22 has an oblong hole, so that the distance of the hook 22 from the edge to the bowl 20 can be adjusted and secured with the screw connection. The hook 22 catches under the rain gutter 42. Because of its shape, it is flexible to a certain extent. The screw connection 40 is arranged such that the surface of the roof 44 is not damaged. A strip of foam rubber is attached to the bottom side of the bowl 20, which rests on the roof 44. If required, the foam rubber can also be used to attach the bowl. The foam rubber forms a cushion to muffle sound and thereby avoids rattling noises.

FIG. 2 shows that the bowl 20 is completely covered by a covering of material. The flap 28 is attached near the edge, which covers the opening required for the screw connection 40, toward the outside. The flap ends in piping 50. Between the bowl 20 and the covering 48 is thin upholstery 52 in the form of foam material. Either the bowl has essentially a smooth surface with a few stays, which are located under the transverse projections 53 shown in FIG. 1, or the bowl 20 itself already has the outer shape of the covering of a convertible, so that the upholstery 52 can have an even thickness.

FIG. 3 shows an alternative to the screw connection 40. The strap 38 and the hook 22 each have a protruding bend 54, which is provided with a hole, through which a screw connection 40, which is aligned parallel to the roof, connects. An oblong hole in the hook 22 makes it possible for the bend of the strap 38 to pass through.

With this type of connection, the bowl 20 can be supported better and damage to the roof by the screw connection 40 is avoided.

In FIG. 4 a clamping element 24 is held directly to the strap 38 with a screw 56. In the example shown it catches under the rain gutter. By turning the screw it is spread, and thereby pulled in the direction of the arrow 42 on both sides, achieving good fastening on the side. Tension, the same as with arrow 58, can, for example, be achieved by the steps according to FIG. 2 or 3, which requires another step.

Figure 5:
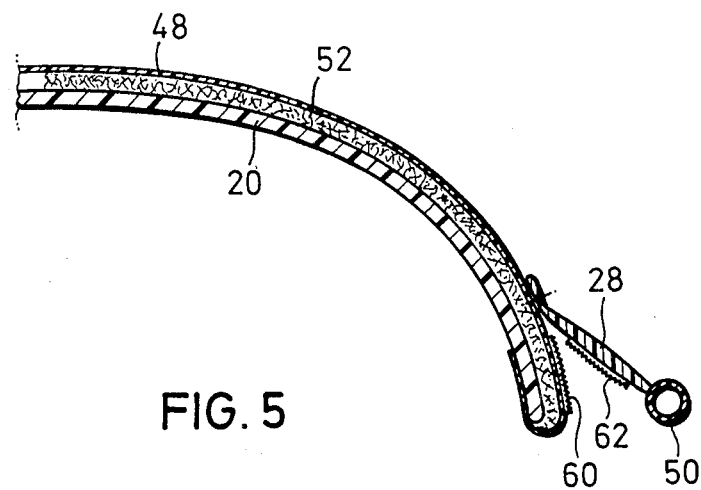
FIG. 5 is another detail of an alternative embodiment showing in detail a flap sewn onto the side, which is held there by a velcro strip.

The example in accordance to FIG. 5 shows an alternative solution to attach the flap 28 to the edge section of the covering 48. A velcro strip is attached to the edge and another velcro strip 62 is attached on the inside of the flap 28. As shown in FIG. 5, the covering is glued to the inside of the bowl 20.

Figure 6:
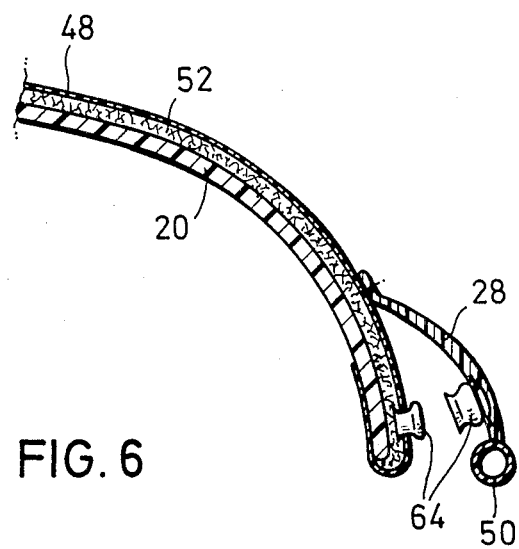
FIG. 6 is an alternative embodiment to FIG. 5, wherein the flap is fastened with a snap.

Finally, in FIG. 6, a snap 64 is provided in place of the velcro strip 60, 62. Several such snaps 64 are located along the flap.

The fastening elements 22, 24 shown in illustrations 2 to 4 can also be used to fasten to the outside of the rain gutter. For example, FIG. 1 shows two hooks 22, which catch the molding strip below the rear window 34. As an alternative, the molding strip may also be removed and the openings below the molding strip can be used for fastening purposes. The spreaders constructed as clamping elements 24 may be used for such fastening.

The typical shape of the covering 48, illustrated in FIG. 1, is made possible by the stay. A convertible roof conversion can be manufactured without such a stay, although this is considered a cheaper version. This produces an essentially smooth shape of the covering 48, the essential aspects of the convertible effect otherwise remaining.

What is claimed is:

1. A simulated convertible roof conversion kit for an automobile with a rigid roof and a rear window, comprising:
    a skeleton-like frame forming a tub-shaped supporting structure having at least one protruding stay perpendicular to the longitudinal direction of the roof when the structure is mounted;
    a covering for the supporting structure, connected to the supporting structure and having an opening in a rear section thereof alignable with the rear window; and,
    fastening means disposed on edge sections of the supporting structure for engaging roof trim structure of the automobile, whereby the conversion may be effected without permanently altering the automobile.

2. A convertible roof conversion kit according to claim 1, wherein the fastening means comprises: a strap affixed to the supporting structure; and, a trim structure engaging hook threadably and adjustably attached to the strap.

3. A convertible roof conversion kit according to claim 1, wherein the fastening means comprises clamping elements.

4. A convertible roof conversion kit according to claim 1, further comprising a layer of padding between the supporting structure and the covering.

5. A convertible roof conversion kit according to claim 1, further comprising foam rubber strips disposed between the supporting structure and the roof.

6. A convertible roof conversion kit according to claim 1, further comprising at least one flap hingeably affixed at one end adjacent to the edge of the covering and releasably attachable close to the edge of the covering.

7. A convertible roof conversion kit according to claim 6, wherein the flap comprises piping at its releasable end.

8. A convertible roof conversion kit according to claim 1, wherein the fastening means comprises adhesive surfaces.

9. A convertible roof conversion kit according to claim 1, wherein the covering is manufactured from one of canvas, foil, plastic material and leatherette.

10. A convertible roof conversion kit according to claim 1, wherein the frame is plastic.

11. A convertible roof conversion kit according to claim 2, wherein the fastening means comprises clamping elements.

* * * * *